United States Patent
Tessier et al.

(10) Patent No.: US 10,988,011 B2
(45) Date of Patent: Apr. 27, 2021

(54) PROFILED REINFORCEMENT ELEMENT

(71) Applicant: CQLT SAARGUMMI TECHNOLOGIES S.À.R.L., Remich (LU)

(72) Inventors: Bernard Tessier, Moulon (FR); David Petry, Schmelz (DE)

(73) Assignee: CQLT SAARGUMMI TECHNOLOGIES S.À.R.L., Remich (LU)

( * ) Notice: Subject to any disclaimer, the term of this patent is extended or adjusted under 35 U.S.C. 154(b) by 256 days.

(21) Appl. No.: 15/778,970

(22) PCT Filed: Nov. 23, 2016

(86) PCT No.: PCT/EP2016/078518
§ 371 (c)(1),
(2) Date: May 24, 2018

(87) PCT Pub. No.: WO2017/089373
PCT Pub. Date: Jun. 1, 2017

(65) Prior Publication Data
US 2018/0345772 A1    Dec. 6, 2018

(30) Foreign Application Priority Data
Nov. 25, 2015 (DE) .................... 10 2015 120 415.0

(51) Int. Cl.
*B60J 10/18* (2016.01)
*B60J 10/32* (2016.01)
(Continued)

(52) U.S. Cl.
CPC ............. *B60J 10/18* (2016.02); *B60J 10/32* (2016.02); *B32B 3/00* (2013.01); *B32B 3/266* (2013.01); *Y10T 428/24198* (2015.01)

(58) Field of Classification Search
CPC ..... Y10T 428/24198; Y10T 428/24314; Y10T 428/12361; Y10T 428/24347; B60J 10/18; B60J 10/32; B32B 3/266
See application file for complete search history.

(56) References Cited

U.S. PATENT DOCUMENTS 6,306,522 B1 * 10/2001 Strutz .................... B60J 10/18
428/122
7,396,685 B2    7/2008 Szyperski
(Continued)

FOREIGN PATENT DOCUMENTS

CN    102811876 A    12/2012
DE    1430614 A1    11/1968
(Continued)

OTHER PUBLICATIONS

Chinese patent application No. 201680066572.7, Office Action dated Aug. 21, 2020, 8 Pages.

*Primary Examiner* — Alexander S Thomas
(74) *Attorney, Agent, or Firm* — Lucas & Mercanti, LLP; Klaus P. Stoffel

(57) ABSTRACT

A profiled reinforcement element and a method for manufacturing such an element to be embedded in an elastomer strip, in particular a sealing strip or edge protection strip, the profiled reinforcement element being formed by a metal strip which is extended by expanding incisions located at a regular distance from each other and is shaped by creating profiled sections and introducing beads. Openings that have a closed rim and are formed by expanding the incisions are completely enclosed by beads.

13 Claims, 3 Drawing Sheets

(51) Int. Cl.
    *B32B 3/00*        (2006.01)
    *B32B 3/26*        (2006.01)

(56)              References Cited

U.S. PATENT DOCUMENTS 7,517,590  B2     4/2009   Wagner
    8,769,877  B2     7/2014   Baratin
  2001/0024732 A1     9/2001   Suitts
  2005/0144849 A1     7/2005   Boutin
  2010/0212230 A1*    8/2010   Ogilvie ................... B60J 10/32
                                                              49/490.1
  2010/0247838 A1     9/2010   Burpo

FOREIGN PATENT DOCUMENTS

DE         19725166 A1    12/1998
  DE      202005002832 U1    5/2005
  FR          1435921 A      4/1966

* cited by examiner

PROFILED REINFORCEMENT ELEMENT

The present application is a 371 of International application PCT/EP2016/078518, filed Nov. 23, 2016, which claims priority of DE 10 2015 120 415.0, filed Nov. 25, 2015, the priority of these applications is hereby claimed and these applications are incorporated herein by reference.

BACKGROUND OF THE INVENTION

The invention pertains to a profiled reinforcement element to be embedded in an elastomer strip, especially a sealing or edge-protection strip, wherein the profiled reinforcement element is formed by a metal strip, which is extended by expanding incisions located at a regular distance from each other and is shaped by creating profiled sections and introducing beads. The invention also pertains to a method for producing a profiled reinforcement element of this type.

A profiled reinforcement element of the type described above is disclosed in DE 197 25 166 A1. By means of edge incisions formed symmetrically to a longitudinal center axis of the metal strip, U-shaped sections connected to each other at their base legs are formed. Each of the U-shaped sections comprises an opening, formed by an incision; this opening extends across the base leg and far into the U-legs of the U-shaped section. On both sides of the elongated opening, beads are formed in each of the U-shaped sections. As a result of the beads, it is possible to produce the profiled element in its totality out of thinner material and thus to save material and weight while preserving the stiffness of the U-shaped sections and retaining the bendability of the profiled element.

SUMMARY OF THE INVENTION

By means of the invention, a new profiled reinforcement element of the above-described type is created, which is characterized in that each of the openings, which are formed by the expansion of the incisions and comprise a closed edge, is completely surrounded by beads.

Because the openings are, according to the invention, completely surrounded by beads, the stiffness of the members forming the profiled reinforcement element can be significantly increased, whereas the profiled element as a whole retains its bendability.

Each of the openings with its completely closed edge is preferably formed in a base leg of a U-shaped section of the profiled reinforcement element, these sections being separated by expanded edge incisions, wherein the U-shaped sections are preferably connected to each other only at their base legs. Whereas the U-shaped profiled members are noticeably stiffened by the complete enclosure of their openings by beads, the connections, limited to the base legs, allow the profiled reinforcement element as a whole to be flexibly deformed to a sufficient degree.

In another preferred embodiment of the invention, each of the beads surrounding an opening merges at a branching point with a bead in a U-leg of the U-shaped section, wherein the branching point in question is in particular a Y-shaped branching point. Because beads are also present in the U-legs, it is possible in particular to increase the spreading resistance of the U-shaped profiled reinforcement element and thus to increase the clamping force of a U-shaped fastening section of a sealing strip which can be mounted on a flange of a vehicle body.

In another preferred embodiment of the invention, the beads surrounding the openings of adjacent base legs comprise in each case a common bead section, wherein this bead section extends in the connecting area between the U-shaped members of the profiled reinforcement element. As a result of such common bead sections, the mobility of the U-shaped sections of the profiled reinforcement element with respect to each other and thus the flexibility of the profiled reinforcement element as a whole are advantageously increased.

Each of the completely closed beads of adjacent base legs preferably merge with the common bead section at a branching point, preferably at a Y-shaped branching point.

In another embodiment of the invention, the middle sections forming the completely closed openings overlap the edge incisions when seen in the longitudinal direction of the strip, wherein the overlapping area preferably coincides with a bending area, in which the U-legs are bent away from the base legs. Because the bending occurs in the overlapping area, the beads which are at an angle here can be easily deformed during the bending process without interfering with the effectiveness of the beads.

The previously mentioned beads in the U-legs do not need to extend all the way to the free end of the U-legs; on the contrary, they can terminate a certain distance away from these free ends. A short, bead-free terminal piece cannot have any significant impact on the stiffness of the U-leg as a whole.

BRIEF DESCRIPTION OF THE DRAWING

The invention is explained in greater detail below on the basis of exemplary embodiments and the attached drawings, which refer to these examples.

DETAILED DESCRIPTION OF THE INVENTION

Figure 1:
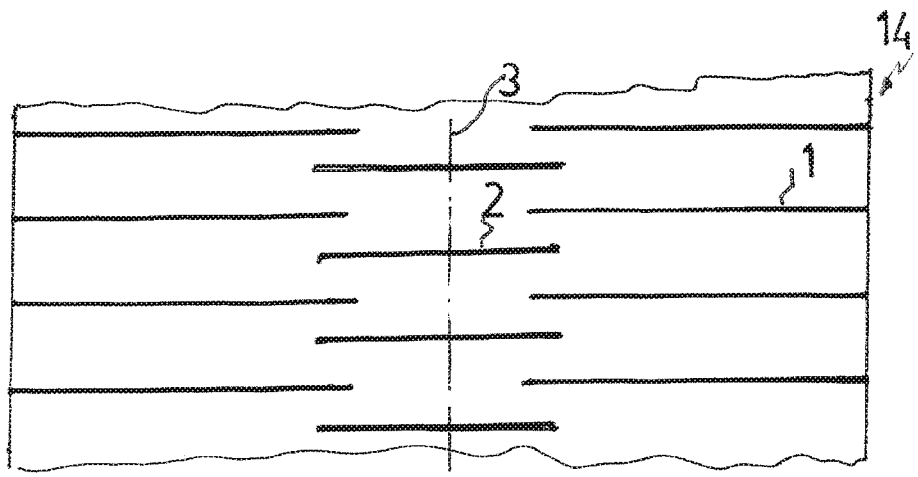
FIG. 1 shows a metal strip with incisions which can be used for the production of a profiled reinforcement element according to the invention.

A strip 14 of sheet steel shown in FIG. 1 for the production of a U-shaped profiled reinforcement element comprises edge incisions 1 on each side, which are open at one end, and center incisions 2, which are closed at both ends. The incisions 1, 2, which are stamped in by means of cutting tools (not shown), are arranged at a regular distance apart, symmetrically to a longitudinal center axis 3 of the metal strip 14, wherein, in the example shown here, they are perpendicular to the longitudinal center axis 3.

As FIG. 1 also shows, the center incisions 2 are offset from the edge incisions 1 in the longitudinal direction of the strip, in each case by a distance equal to half the distance between adjacent edge incisions 1 or center incisions 2. When seen in the longitudinal direction of the strip, the center incisions 2 and the edge incisions 1 overlap each other.

Figure 2:
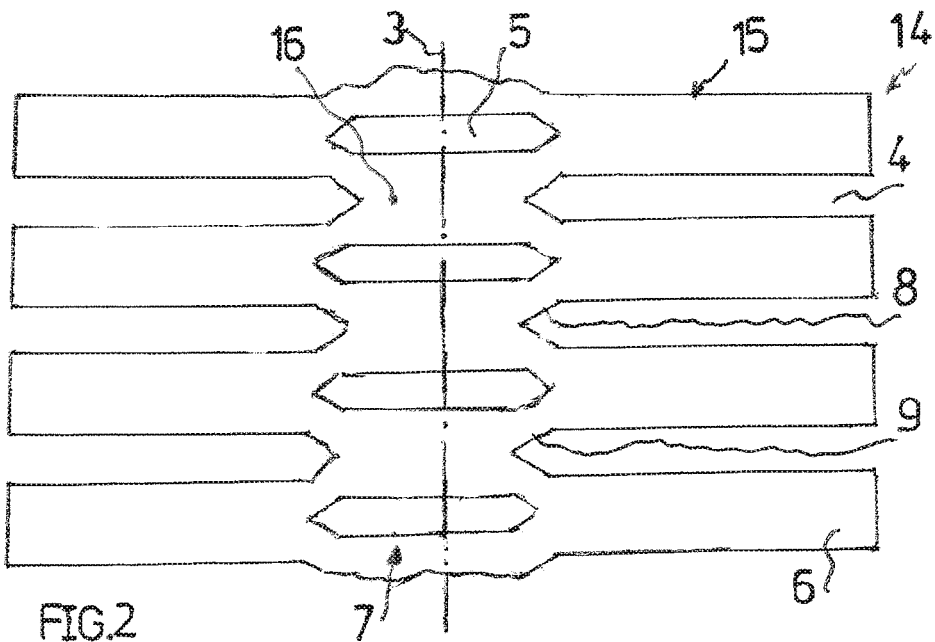
FIG. 2 shows the metal strip of FIG. 1 in the expanded state.

FIG. 2 shows the sheet-metal strip 14 of FIG. 1 after it has been expanded in the longitudinal direction of the strip uniformly over its entire width in accordance with a further processing step for the production of the U-shaped profiled reinforcement element.

During this expansion process, the edge incisions 1 and the center incisions 2 are expanded in the longitudinal direction of the strip to form elongated openings 4 and also elongated openings 5, which are closed all the way around. Between each pair of adjacent openings 4 there is a section 15 for the formation of a U-shaped section consisting of U-legs 6 and a base leg 7, each of these base legs comprising one of the openings 5. Each of the U-legs 6 merges with the base leg 7 by way of two angled web sections 8 and 9. At 16, the sections 15 are connected to each other at their base legs 7.

Figure 3:
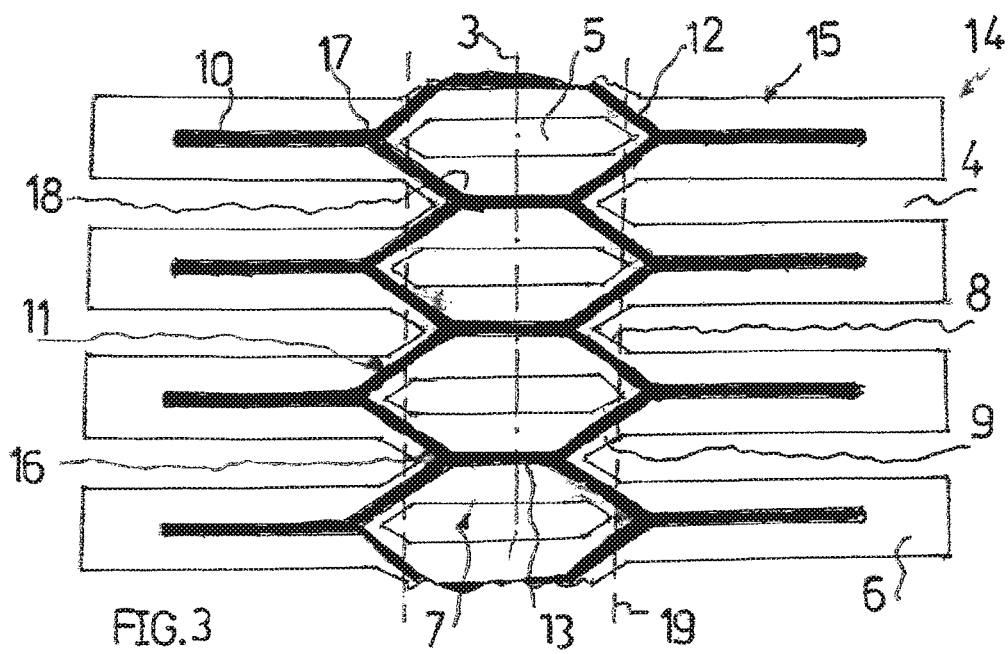
FIG. 3 shows the expanded metal strip of FIG. 2 provided with beads.

FIG. 3 shows the sheet-metal strip of FIG. 2 after another processing step.

As FIG. 3 reveals, a bead 10 is introduced into each of the U-legs 6, this bead being located in the middle of the U-leg 6, parallel to the edges of the adjacent openings 4. In each of the base legs 7, there is a bead 11 in the form of a closed ring, surrounding the elongated opening 5. The beads 10 in the base legs 6 are connected by Y-shaped branching points 17 to the closed, ring-shaped beads 11 in the base legs 7. The beads 10 terminate a certain distance away from the free ends of the U-legs.

Next to the bead sections 12 in the angled web sections 8, 9, the beads 11 comprise bead sections 13, which are common to both of the adjacent beads 11. The bead sections 13 extend along the connections 16 between the sections 15 of the profiled reinforcement element, wherein there is a Y-shaped branching point 18 at each end of the common bead sections 13.

Figure 4:
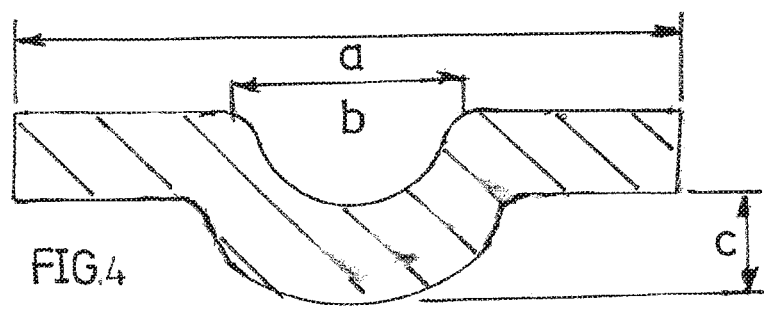
FIG. 4 shows a cross-sectional detail of the beaded metal strip of FIG. 3.

FIG. 4 shows one of the web sections 8, 9 in cross section. In the example in question here with a sheet metal thickness of 0.35 mm, the web has a thickness a of 1.5 mm; the width b of the bead is 0.5 mm; and the height c of the shape formed by the bead is 0.25 mm.

The sheet-metal strip 14 processed according to FIG. 3 is then profiled by bending it around bending axes, which are parallel to the longitudinal center axis 3. The bending areas are indicated by the dotted lines 19. The bending into a U-shaped profile occurs primarily by the bending of the web sections 8, 9 and therefore occurs in the area where, with respect to the longitudinal direction of the strip, the incisions 1, 2 overlap.

The beads 10, 11 described above make it possible to use thinner sheet metal material to produce profiled reinforcement elements with the same stiffness and flexibility properties; as a result, both weight and material can be saved. Because the U-legs 6 are bent over in the area where the edge and center incisions 1, 2 overlap and thus where the openings 4, 5 formed by the expansion of the incisions also overlap, the bead sections 12 extending at an angle in the bending area undergo almost no flattening when they are bent. The resistance of the U-shaped profile to spreading remains intact.

In the exemplary embodiment being described here, the beads comprise a bead cross section which remains constant in the longitudinal direction. In a departure from that feature, the cross section can change in the longitudinal direction, in particular in such a way that the beads are prevented from flattening in the bending area.

In the following figures, the same parts or parts with the same function are designated by the same reference numbers as in the preceding figures, wherein the letter "a" or "b" is appended to the reference number in question.

Figure 5:
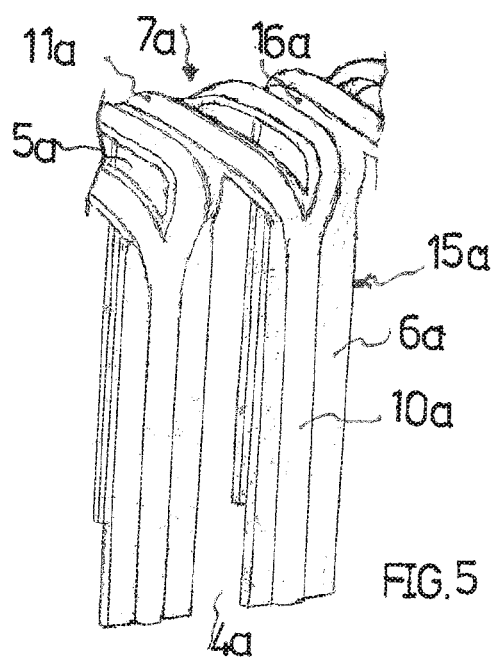
FIG. 5 shows another exemplary embodiment of a profiled reinforcement element according to the invention.

FIG. 5 shows a completely profiled reinforcement element, which differs from the previously described profiled element in that the base leg sections 7a comprise only closed, ring-shaped beads 11a, which have no bead section in common with adjacent beads 11a. The connections 16a between the U-shaped sections 15a of the profiled reinforcement element are in each case between the beads 11a.

Figure 6:
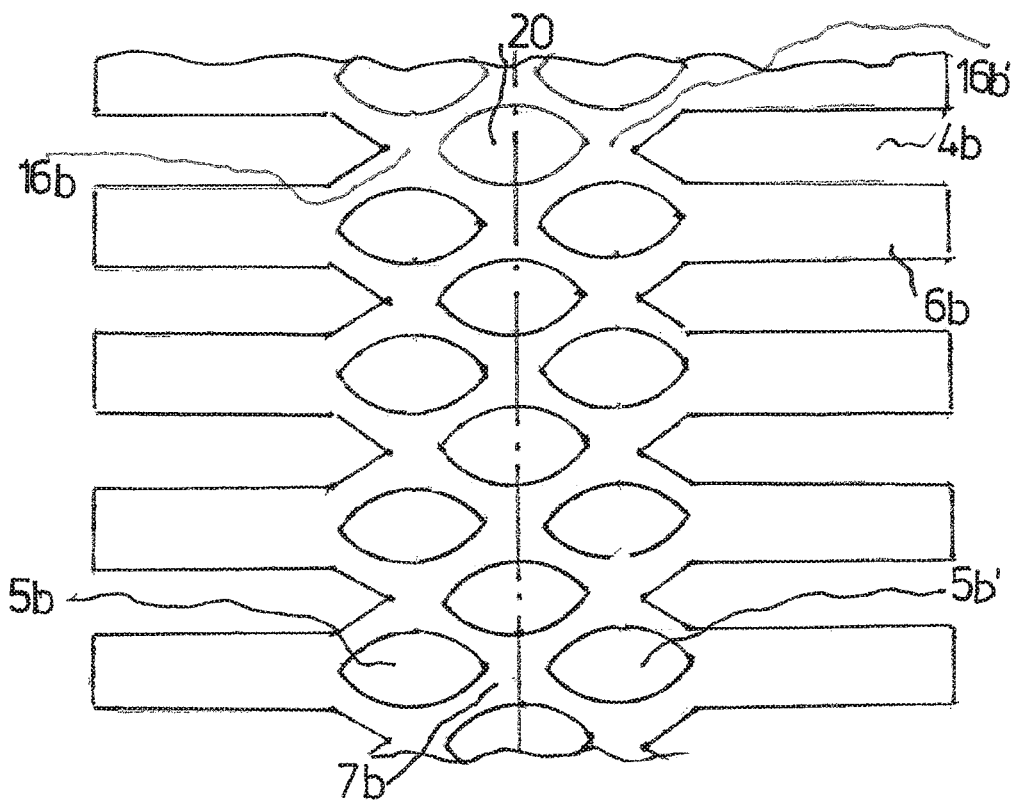
FIG. 6 shows an expanded metal strip according to a third exemplary embodiment of the invention.

A sheet-metal strip for forming a profiled reinforcement element shown in FIG. 6 comprises openings 4b, formed by expanded edge incisions; these openings separate sections 15b from each other to form the U-shaped sections, each of which consists of U-legs 6b and a base leg 7b.

Each of the base legs 7b comprises two elongated openings 5b and 5b', the longitudinal axes of which are oriented in the same direction as the longitudinal axes of the U-legs 6b. The sections 15b are connected to each other at 16b and 16b', wherein, between the connections 16b, 16b', there is, in addition to the openings 4b, in each case an elongated opening 20 separating the sections 15b from each other.

Figure 7:
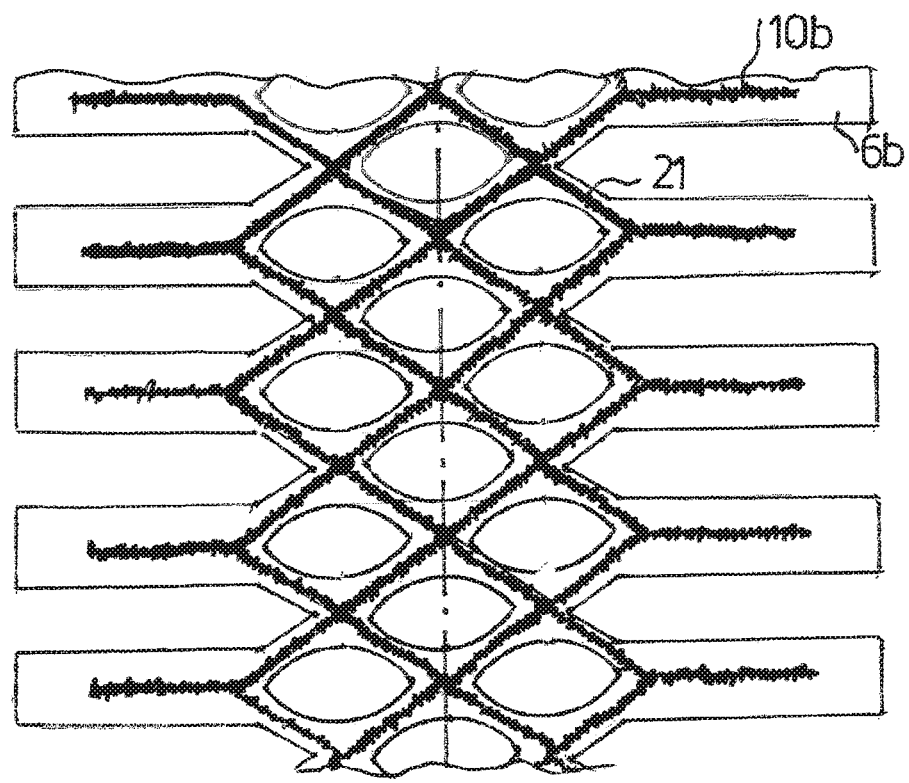
FIG. 7 shows the metal strip of FIG. 6 provided with beads.

As can be seen in FIG. 7, beads 10b formed in the U-legs 6b merge with a diamond-shaped pattern of ring beads 21, which completely surround each of the openings 5b, 5b', and 20.

FIG. 5 reveals that the beads 10a, 11a curve toward the outside, relative to the U-shape of the profiled reinforcement element. It has been found, however, that, by the use of U-shaped profiled reinforcement elements in which the beads curve toward the inside relative to the U-shaped profile, the sealing strips can exert much stronger retaining forces on vehicle body flanges. By bending flat, previously beaded sheet-metal strips of this type into a U shape, cold work hardening occurs to a greater degree than in the case of the embodiment shown in FIG. 5.

Whereas it is possible to introduce the beads after the openings have already been formed by the expansion of the slotted sheet-metal strip to open up the slots or possibly even after the sheet-metal strip has already been bent into a U profile, the production of the profiled reinforcement element can also begin with the introduction of the beads. The slots would be formed and the metal strip expanded only after that. Finally, the beads could also be introduced after the formation of the incisions and before the expansion. The simultaneous production of beads and slots by means of a single tool, for example, would also be possible.

The relatively tedious processing of the metal strip can be accomplished together with the extrusion of the profiled sealing element; i.e., the processed sheet metal strip which has been formed into the profiled reinforcement element can be sent immediately after processing to an extrusion machine so that it can be embedded in the sealing strip.

The invention claimed is:

1. A profiled reinforcement element to be embedded in an elastomer strip, wherein the profiled reinforcement element is formed by a metal strip that is extended by expanding incisions located at a regular distance from each other and is shaped by profiled sections and beads, wherein the expanded incisions form openings, the openings including openings with a closed edge, the openings with a closed edge being completely surrounded by beads, wherein each of the completely closed openings is formed only in a respective base leg of U-shaped sections of the profiled reinforcement element, which are separated from each other by expanded edge incisions.

2. The profiled reinforcement element according to claim 1, wherein each of the beads completely surrounding the openings merges at a branching point with a bead in a U-leg of the U-shaped section.

3. The profiled reinforcement element according to claim 2, wherein the branching point is a Y-shaped branching point.

4. The profiled reinforcement element according to claim 2, wherein each of the beads in the U-legs terminates a certain distance away from or at a free end of the U-leg.

5. The profiled reinforcement element according to claim 1, wherein the beads of adjacent base legs completely surrounding the openings comprise a common bead section in all cases.

6. The profiled reinforcement element according to claim 5, wherein the beads of adjacent base legs merge with each other at Y-shaped branching points in all cases.

7. The profiled reinforcement element according to claim 1, wherein the incisions included center incisions, the center incisions forming the completely closed openings and, when seen in the longitudinal direction of the strip, overlapping the edge incisions.

8. The profiled reinforcement element according to claim 7, wherein the overlapping has an area that coincides with a bending area, in which the U-legs are bent away from the base legs, wherein the overlapping area extends through the entire bending area.

9. The profiled reinforcement element according to claim 1, wherein the beads comprise a cross-sectional profile that changes in a longitudinal direction of the bead.

10. The profiled reinforcement element according to claim 1, wherein the beads curve outwardly and/or inwardly relative to the U-shape of the profiled reinforcement element.

11. A method for producing a profiled reinforcement element to be embedded in an elastomer material of a sealing or edge-protection strip, comprising the steps of:
    forming incisions in a sheet-metal strip;
    expanding the sheet-metal strip in a longitudinal direction of the strip to form openings;
    profiling the expanded sheet-metal strip by bending the strip around bending axes parallel to a longitudinal axis of the strip; and
    completely surrounding each of the openings formed by the expansion of the incisions and which comprises a closed edge by beads, wherein each of the completely surrounded openings is formed only in a respective base leg of U-shaped sections of the profiled reinforcement element, which are separated from each other by expanded edge incisions.

12. The method according to claim 11, including introducing the beads into the sheet-metal strip
    before the forming of the incisions,
    after the forming of the incisions and before the expansion, or
    after the expansion.

13. The method according to claim 11, further comprising sending, immediately after processing of the sheet-metal strip, the profiled reinforcement element to an extrusion machine for producing an elastomer strip containing the profiled reinforcement element.

\* \* \* \* \*